LE ROY B. FRASER.
METHOD OF AND APPARATUS FOR IMPOSING FORM ELEMENTS.
APPLICATION FILED APR. 30 1917. RENEWED JAN. 2, 1919.
1,313,082.
Patented Aug. 12, 1919.
3 SHEETS—SHEET 3.
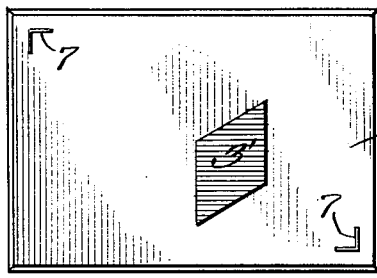
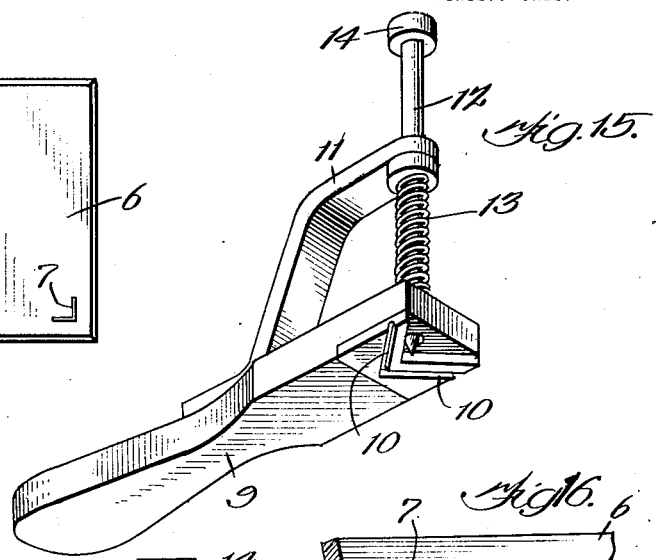
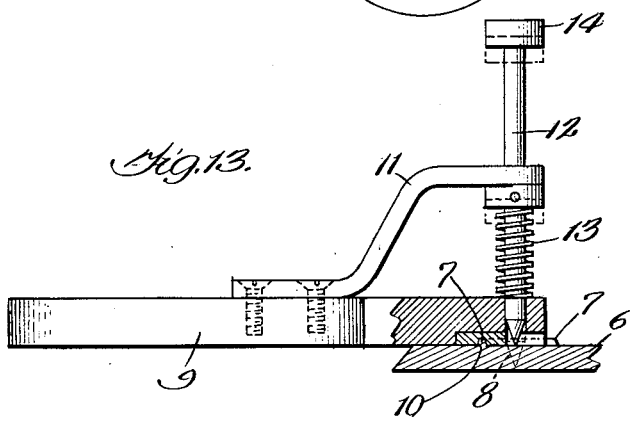
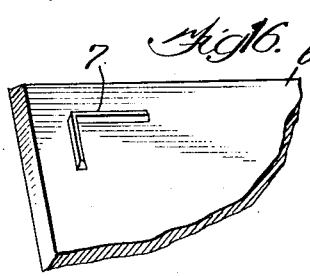
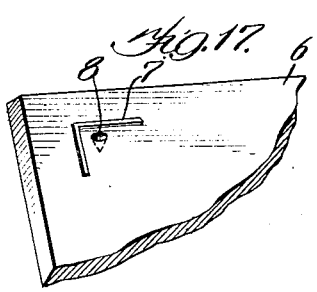
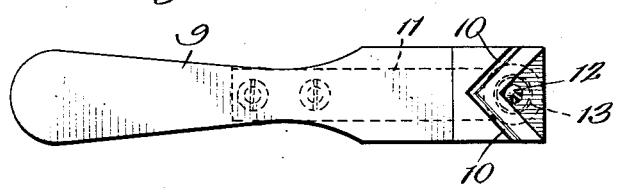
Inventor:
Le Roy B. Fraser
By G. L. Cragg
Atty.

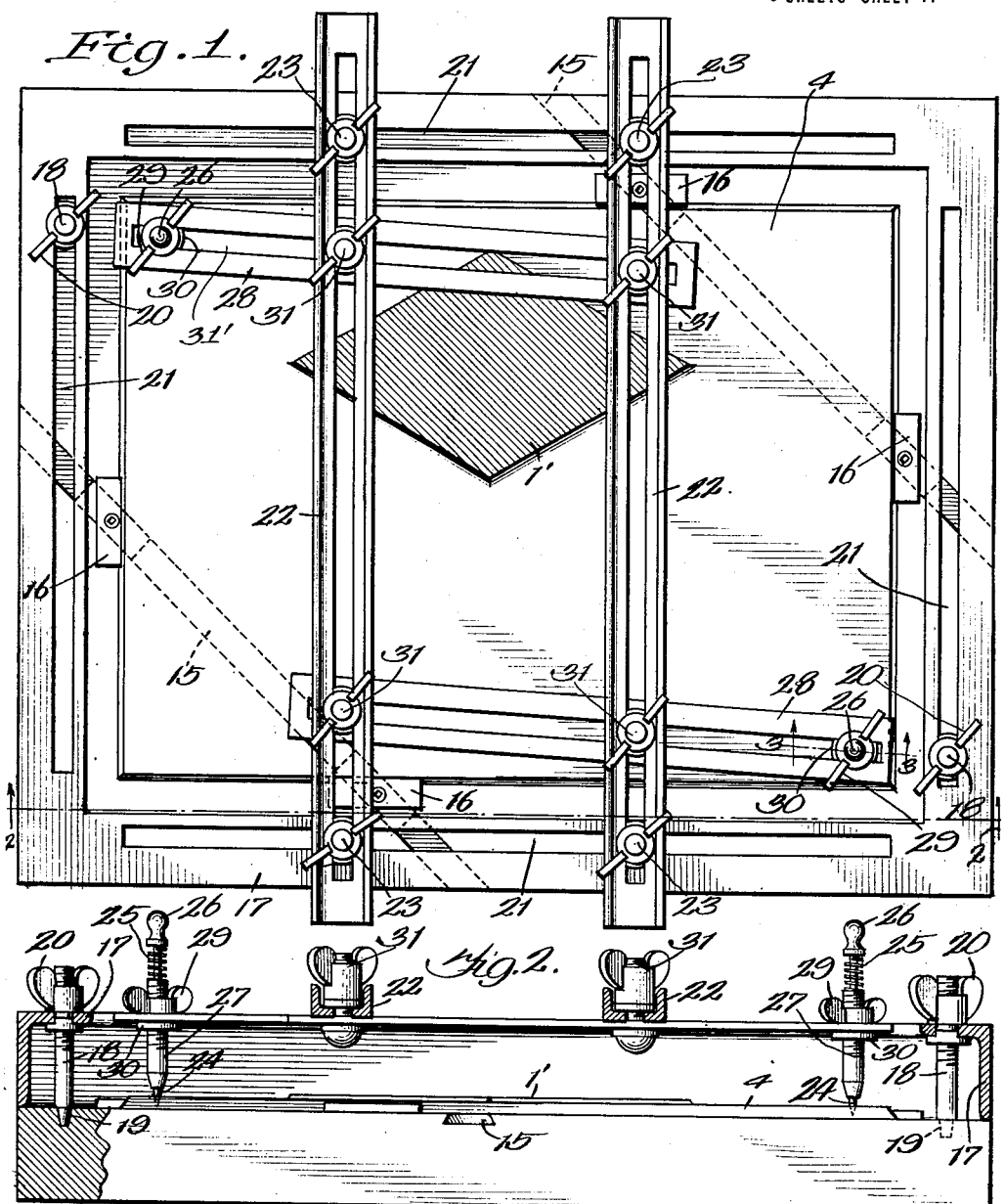

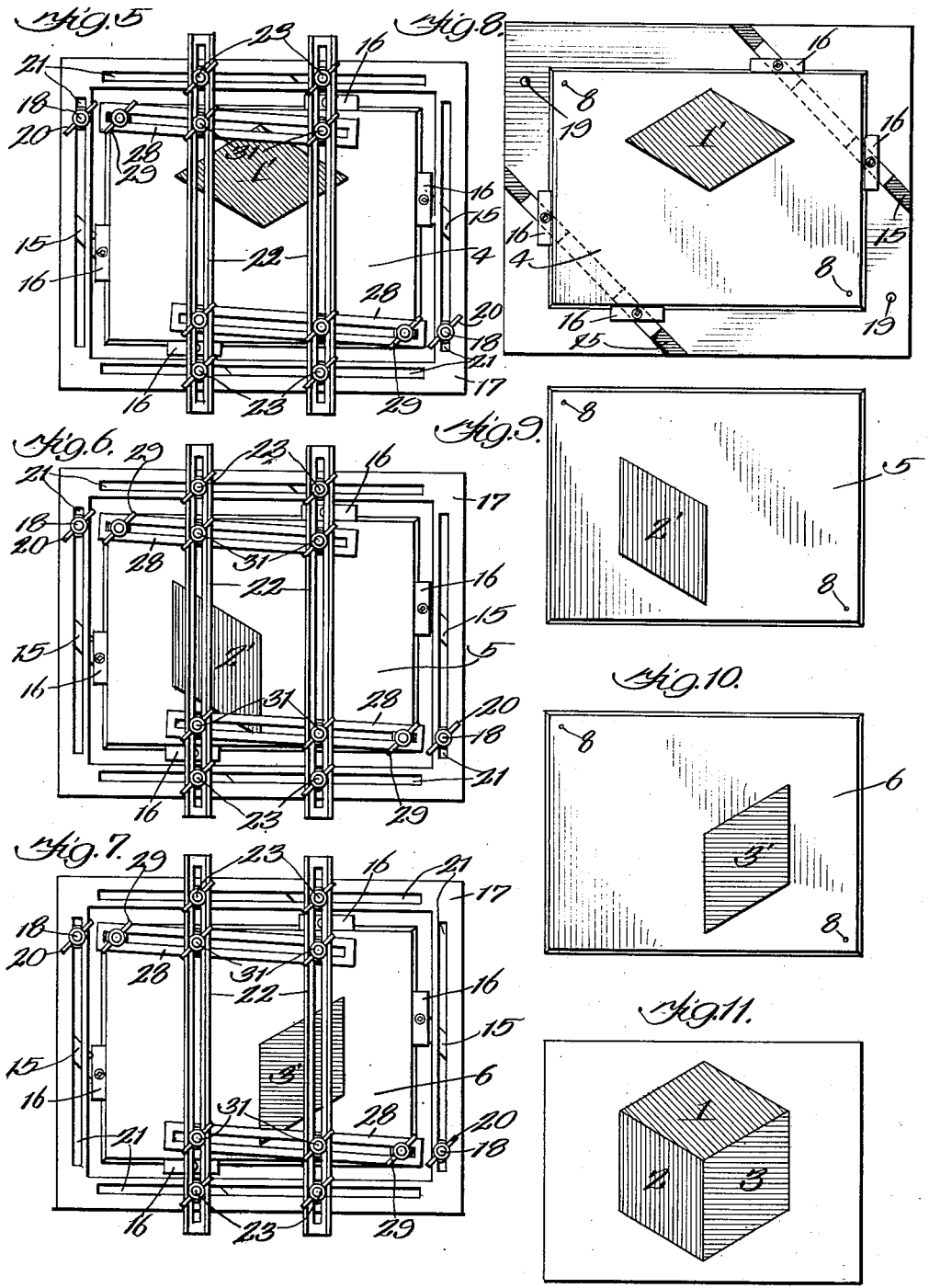

UNITED STATES PATENT OFFICE.

LE ROY B. FRASER, OF NEW HAVEN, CONNECTICUT.

METHOD OF AND APPARATUS FOR IMPOSING FORM ELEMENTS.

1,313,082. Specification of Letters Patent. Patented Aug. 12, 1919.

Application filed April 30, 1917, Serial No. 165,372. Renewed January 2, 1919. Serial No. 269,393.

*To all whom it may concern:*

Be it known that I, LE ROY B. FRASER, citizen of the United States, residing at New Haven, in the county of New Haven and State of Connecticut, have invented a certain new and useful Improvement in Methods of and Apparatus for Imposing Form Elements, of which the following is a full, clear, concise, and exact description.

My invention relates to a method of and apparatus for imposing complemental form elements employed in multi-color printing, the method of my invention consisting in providing the form elements with registering formations in similar location with respect to the complete print said form elements are to produce, imposing one of said form elements upon a base that is provided with registering formations, superimposing a gage upon said base and in register with the registering formations of said base, fixing or locating registering formations upon said gage in register with the registering formations of the imposed form element, placing said gage in registry with said base or a base with similar registering formations for a succeeding imposition, imposing another of said form elements with its registering formations in registry with the registering formations that are fixed upon said gage, and removing the gage to permit printing from the latter form element.

By means of my invention complemental form elements employed in multi-color printing may readily be substituted for each other upon a supporting base in exactly the right relation to the base to enable these form elements to produce their parts or sections of the prints the form elements are to produce, in exact register. The registering formations upon the form elements are located thereon in any suitable way if it is necessary to add such without relying upon the mere shape of the form elements themselves. Where these form elements are in the nature of plates having thereon form surfaces corresponding to different portions of the print to be produced such plates may be made in various ways and registering formations may be added thereto, if extra formations are necessary, in a convenient manner. In some instances artists produce on separate sheets and on sites of exactly similar dimensions, component sections of a drawing, painting, or other illustrating matter corresponding to component sections of the print to be produced, and locate each section in proper relation to its site. Each site is exactly defined by corner forming lines at diagonally opposite corners of each sheet. The sections of the illustrating matter upon the various sheets are in such relation to their sites as defined by said corner forming lines that if the sites of the sheets are superimposed one upon another in exact register the sections of illustrating matter would come into exact register. Hitherto these corner forming lines have been erased before the sectional drawings or other sectional illustrating matter are photographed to form printing plates. I, however, reproduce these corner forming lines upon the plates and with the guidance thereof form recesses in the plates that constitute the registering formations thereof which are in similar relation with respect to the complete print the plates are to produce. After these registering formations have been produced upon the plates I remove said corner forming lines as they are no longer required.

The registering formations upon the base, if the base is of such a nature as to require the addition of these formations thereto, are desirably in the nature of recesses in the top of the base. The gage desirably carries depending pins that enter these recesses in the base. The registering formations upon the gage that enter the recesses upon the plates are adjustable and are brought into register with the recesses upon a plate after this plate has been imposed upon the base in the desired position. After this imposed plate has been used in printing it may be replaced by a succeeding plate that is imposed upon the base in exactly right position by bringing the registering formations of the succeeding plate into exact register with the registering formations of the gage that registered with the registering formations upon the previous plate. In one given printing operation the same base may be used or another base of exactly the same construction and arrangement of registering formations thereon.

I will explain my invention more fully by reference to the accompanying drawings illustrating a simplified embodiment of the structure of the invention and showing apparatus by means of which the method of my invention may be practised. In the drawings Figure 1 is a plan view of a simplified form of the invention; Fig. 2 is a sectional view on line 2—2 of Fig. 1; Fig. 3 is a sectional view on line 3—3 of Fig. 1; Fig. 4 is a sectional view on line 4—4 of Fig. 3; Figs. 5, 6 and 7 illustrate the structure of Fig. 1 showing the method of imposing complemental plates upon the same base or exactly similar bases; Fig. 8 shows in plan the plate of Fig. 5 and the base on which this plate is imposed, this figure showing the registrating formations of this base and plate; Fig. 9 illustrates the succeeding plate whose imposition is illustrated in Fig. 6; Fig. 10 illustrates a succeeding plate whose imposition is illustrated in Fig. 7; Fig. 11 illustrates a complete print produced by the complemental plates illustrated in Figs. 8, 9 and 10; Fig. 12 illustrates one of the plates produced from an artist's drawing before the site defining corner forming lines have been routed from the plate; Fig. 13 is a view, partially in section, illustrating a tool that may be employed to form the registering recesses that are located with the aid of the corner forming lines and the tool coöperating with such lines; Fig. 14 is a bottom view of the tool; Fig. 15 is a perspective view of the tool; Fig. 16 is a perspective view illustrating the corner forming lines on a corner portion of a plate before the adjacent registering recess is formed; and Fig. 17 illustrates the location of the registering recess in the plate portion illustrated in Fig. 16, after the formation of which the corner forming lines are routed away to leave only the registering recess, as illustrated clearly in Figs. 8, 9 and 10.

Like parts are indicated by similar characters of reference throughout the different figures.

The embodiment of the invention herein illustrated concerns the employment of complemental plates as the complemental form elements employed to produce multi-color prints, but it is to be understood that the invention is not to be limited to the nature of the form elements employed in the printing process.

The print to be produced is illustrated in Fig. 11 as being a perspective view of a cube whose top and two sides are to be of different colors. The top side 1 is illustrated, in Fig. 11, as being green, the side 2 is red, and the side 3 is blue. The plates 4, 5 and 6 that bear print producing portions $1^1$, $2^1$, $3^1$ corresponding to the portions 1, 2 and 3 of the complete print are respectively similarly shaded to the portions 1, 2, 3. In the embodiment of the invention illustrated each section 1, 2, 3 is produced from a similar drawing thereto which, together with the site defining corner producing lines, are reproduced upon the plate, the plate 6 as illustrated in Fig. 12 having the cube side 3 reproduced at $3^1$ thereon together with the corner forming site defining lines 7. It should be understood that each of the plates 4 and 5 have similar lines 7 reproduced thereon. The registering formations 8 are produced by means of a tool 9 having angularly related grooves 10 that are designed to fit each pair of corner producing lines 7, see Fig. 13. The base of the tool carries a bracket 11, this base and bracket having vertically alined openings therein through which a plunger 12 operates. This plunger is upwardly pressed by a spring 13. The plunger has a head 14 by which it may be depressed against the force of the spring. When the grooves 10 receive the lines 7 the plunger is depressed to form a registering recess 8. This recess forming operation is repeated at each of two diagonally opposite corners of each plate. As the corner lines 7 upon the different plates are in similar location with respect to a complete print the plates are to produce and as the registering formations 8 are in similar positions with respect to the corner lines, these registering formations are the ones which are employed in guiding the imposition of the plates.

The first plate or form element that is imposed upon the base may be so imposed without the guiding aid of its registering formations 8, the base having diagonal slots 15 or other suitable formations for coöperation with plate holding or registering hooks 16 which are employed to position the plate in exactly the relation desired with respect to the base. In Figs. 1 and 5 the plate 4 is illustrated as thus being imposed upon a base 9. After the first plate has been imposed a registering gage 17 is superimposed upon the plate, this registering gage having depending pins 18 that constitute registering formations thereon that may be brought to register with registering recesses or sockets 19 in the base, the formations 18 and 19 constituting pin and socket registering formations for the base and the gage. These pins 18 are adjustable in slots 21 formed in two opposite sides of the gage 19. The remaining sides of the gage have slots 21 which are crossed by slotted bars 22, clamping screws 23 passing through the slots 21 and the slots in the bars 22 whereby these bars may be placed in any suitable positions upon the gage. On occasion the bars 22 may cross adjacent slots 21 in which event the clamping screws 23 will pass through these slots where crossed to clamp the bars upon adjacent sides of the gage. There are two bars 22 shown, constituting a pair of coöperating bars, though it is to be understood that where the invention is practised on a larger scale than that illustrated there is a plurality of pairs of such bars that may be assembled in various positions upon the gage. The registering elements 24 carried by the gage are those which are to be located in registry with the registering formations 8 of the first imposed plate while the registering pins 18 are in the registering sockets 19. These form section locating registering formations 24 are in the form of pins that are downwardly spring pressed by springs 25 which are provided with thumb and finger holds 26 by which these pins may be drawn upwardly against the force of said springs. These pins are mounted in carriers 27 that are clampingly engaged in supporting bars 28 by means of wing nuts 29 threaded upon said carriers, these wing nuts being upon one side of the bars 28 and having complemental nuts 30 upon the other side of said bars whereby the clamping action may be effected. The bars 28 are provided with slots 30' along which said wing nuts and their complemental parts may be moved. These bars are held in clamping engagement with the bars 22 by means of clamping screws 31 passing through the slots of bars 22 and the slots of bars 28, a pair of clamping screws 31 holding each bar 28 in selected relation with the two bars 22. Initially the wing nuts 29 and the clamping screws 31 are loose. The pin 24 upon one bar is first withdrawn and afterward allowed to enter one recess 8 in the imposed plate, this entry being effected when the finger hold 26 is released to allow the spring 25 to depress the pin 24 into the recess 8 over which this pin is placed. After the pin 24 has thus been located, the wing nut and the clamping screws 31 pertaining to the bar 28 carrying such pin 24 are tightened. After this pin 24 has been thus located in registry with one of the recesses 8 the other pin 24 upon its bar 28 is similarly located in registry with the remaining recess 8, the bar 28 of the second pin being adjustably assembled with the bars 22 as has been described in connection with the bar 28 carrying the first aforesaid pin 24. Both pins 24 are now in fixed location with respect to the gage and as the gage has its pins 18 in fixed relation with the recesses 19, the gage may be employed in guiding the imposition of a succeeding plate upon such base or a similar base. In this use of the gage its registering pins 18 that are relatively fixed to each other and to pins 24 are first engaged with the registering sockets 19 upon the base. This location of the gage upon the base defines the exact location of the registering openings 8 of the succeeding plate, the pins 24 being over the spots where the registering openings 8 of the succeeding plate are to be located. The succeeding plate is placed upon the base and moved along the same until its recesses 8 are in line with the pins 24 which are drawn upwardly against the force of their springs 25 until these openings 8 are in alinement with the pins 24 whereafter said pins are released to allow the springs 25 to force the pins 24 into the openings 8 of the succeeding plate. The engagement of these pins and the succeeding plate is maintained until the registering hooks 16 (which were loosened to permit the removal of the first plate) are brought into position to hold the succeeding plate in relation to the base in exactly the position defined by the pins 24. After the succeeding plate has been clamped to the base the registering gage is removed to permit of the printing operation involving this succeeding plate.

The adjustment of the gage upon the base and the first plate may occur before or after the first printing operation and if it occurs before the first printing operation the gage is removed to permit of such printing operation. If there are more than two plates that would be employed in producing a print, each succeeding plate is positioned upon the base in the manner which has been described in connection with the second plate. As illustrated in Figs. 5, 6, 7, 8, 9, 10 and 11, the first printing operation with the plate 4 produces the print section 1, the second printing operation produces the print section 2 and the third printing operation produces the print section 3, the registering formations 8 upon the plates 4, 5 and 6 being in similar location with respect to the complete print said plates or form elements are to produce. Particular care is needed to be exercised only in connection with the impression of the first plate or form element, the imposition of the succeeding plates or form elements being accurately determined with the aid of the gage that has its registering formations 18 set to correspond with the registering formations 19 of the base 9 and its registering formations 24 set with respect to the registering formation 8 of the first imposed plate. I am thus not only able to properly register the complemental form elements employed in multi-color printing but am able to expedite the speed with which those form elements that follow the first imposed form element may be imposed.

I claim:—

1. Imposing apparatus for form sections employed in multi-color printing including a form section supporting base; a removable gage adapted to be superimposed upon said base, the base and gage having complemental registering formations insuring a predetermined location of the gage upon the base and including depending form section locating registering pins adjustable on said gage and over the base, said gage having slotted sides; slotted bars crossing said slotted sides; bar clamping screws passing through the slots in the bars and the slots in the sides of the gage; slotted pin holding bars crossing the other bars; and clamping screws passing through the slots of said crossed bars.

2. Imposing apparatus for form sections employed in multi-color printing including a form section supporting base; a removable gage adapted to be superimposed upon said base, the base and gage having complemental registering formations insuring a predetermined location of the gage upon the base and including depending downwardly spring pressed form section locating registering pins on said gage and over the base, said gage having slotted sides; slotted bars crossing said slotted sides; bar clamping screws passing through the slots in the bars and the slots in the sides of the gage; slotted pin holding bars crossing the other bars; and clamping screws passing through the slots of said crossed bars.

3. Imposing apparatus for form sections employed in multi-color printing including a form section supporting base; a removable gage adapted to be superimposed upon said base, the base and gage having complemental pin and socket registering formations insuring a predetermined location of the gage upon the base and including depending form section locating registering pins adjustable on said gage and over the base, said gage having slotted sides; slotted bars crossing said slotted sides; bar clamping screws passing through the slots in the bars and the slots in the sides of the gage; slotted pin holding bars crossing the other bars; and clamping screws passing through the slots of said crossed bars.

4. Imposing apparatus for form sections employed in multi-color printing including a form section supporting base; a removable gage adapted to be superimposed upon said base, the base and gage having complemental pin and socket registering formations insuring a predetermined location of the gage upon the base and including depending downwardly spring pressed form section locating registering pins on said gage and over the base, said gage having slotted sides; slotted bars crossing said slotted sides; bar clamping screws passing through the slots in the bars and the slots in the sides of the gage; slotted pin holding bars crossing the other bars; and clamping screws passing through the slots of crossed bars.

5. Imposing apparatus for form sections employed in multi-color printing including a form section supporting base; a removable gage adapted to be superimposed upon said base, the base and gage having complemental registering formations insuring a predetermined location of the gage upon the base and including depending form section locating registering pins adjustable on said gage and over the base, said gage having slotted sides; slotted bars crossing said slotted sides; bar clamping screws passing through the slots in the bars and the slots in the sides of the gage; slotted pin holding bars crossing the others bars; clamping screws passing through the slots of said crossed bars; and clamping means carrying said pins and movable in the slots of the bars.

6. Imposing apparatus for form sections employed in multi-color printing including a form section supporting base; a removable gage adapted to be superimposed upon said base, the base and gage having complemental registering formations insuring a predetermined location of the gage upon the base and including depending form section locating downwardly spring pressed registering pins on said gage and over the base, said gage having slotted sides; slotted bars crossing said slotted sides; bar clamping screws passing through the slots in the bars and the slots in the sides of the gage; slotted pin holding bars crossing the other bars; clamping screws passing through the slots of said crossed bars; and clamping means carrying said pins and movable in the slots of the bars.

7. Imposing apparatus for form sections employed in multi-color printing including a form section supporting base; a removable gage adapted to be superimposed upon said base, the base and gage having complemental pin and socket registering formations insuring a predetermined location of the gage upon the base and including depending form section locating registering pins adjustable on said gage and over the base, said gage having slotted sides; slotted bars crossing said slotted sides; bar clamping screws passing through the slots in the bars and the slots in the sides of the gage; slotted pin holding bars crossing the other bars; clamping screws passing through the slots of said crossed bars; and clamping means carrying said pins and movable in the slots of the bars.

8. Imposing apparatus for form sections employed in multi-color printing including a form section supporting base; a removable gage adapted to be superimposed upon said base, the base and gage having complemental pin and socket registering formations insuring a predetermined location of the gage upon the base and including depending downwardly spring pressed form section locating registering pins on said gage and over the base, said gage having slotted sides; slotted bars crossing said slotted sides; bar clamping screws passing through the slots in the bars and the slots in the sides of the gage; slotted pin holding bars crossing the other bars; clamping screws passing through the slots of crossed bars; and clamping means carrying said pins and movable in the slots of the bars.

In witness whereof, I hereunto subscribe my name this 9th day of April A. D. 1917.

LE ROY B. FRASER.